Nov. 14, 1933.  J. FALLOU  1,935,439
FAULT RESPONSIVE APPARATUS FOR ELECTRIC SYSTEMS
Filed May 3, 1932
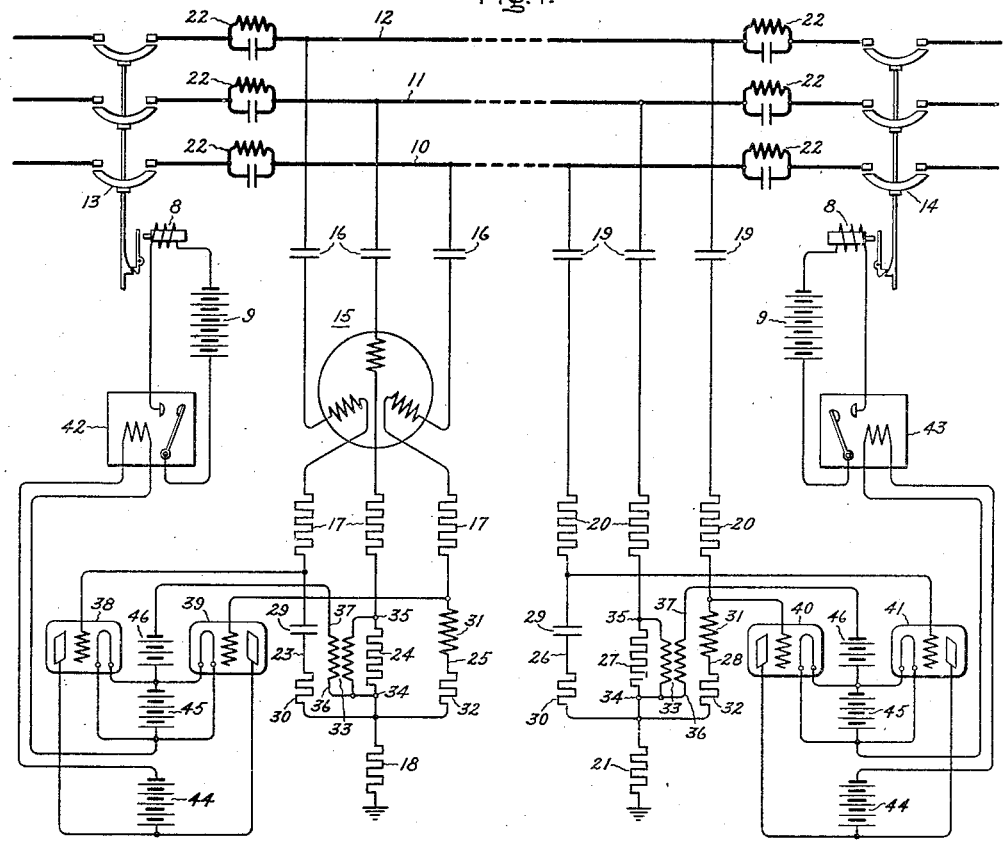
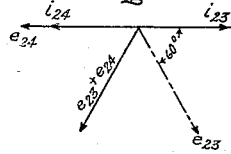
Fig. 3.
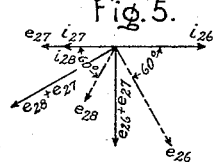
Fig. 4.
Fig. 5.
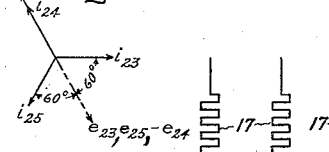
Fig. 2.
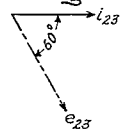
Fig. 6.
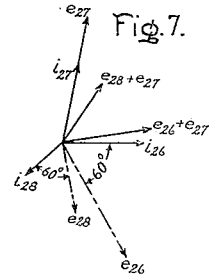
Fig. 7.
Inventor:
Jean Fallou,
by Charles E. Tullar
His Attorney.

Patented Nov. 14, 1933

1,935,439

UNITED STATES PATENT OFFICE 1,935,439

FAULT RESPONSIVE APPARATUS FOR ELECTRIC SYSTEMS

Jean Fallou, Paris, France, assignor to General Electric Company, a corporation of New York Application May 3, 1932, Serial No. 608,903, and in France June 26, 1931

7 Claims. (Cl. 175—294)

My invention relates to improvements in fault responsive apparatus for electric systems and more particularly to improvements in fault responsive apparatus wherein a polyphase current of a frequency differing from the frequency of the power current of the system is superimposed on the conductors of the system for the purpose of selectively indicating and/or isolating a faulty portion of the system. An object of my invention is to provide improved fault responsive apparatus which is highly sensitive to phase unbalance of the superimposed polyphase current caused by a fault and which is capable of providing a high speed of operation so that a faulty portion of the system can be quickly isolated. Other objects of my invention will appear hereinafter.

In general, my invention relates to improvements in fault responsive apparatus of the type disclosed in my copending application, Serial No. 537,401, filed May 14, 1931. The fault responsive apparatus therein disclosed is for the selective indication and/or protection of electric power lines. In this apparatus there is normally superimposed on the line conductors at one point of the line by means of a suitable source or generator, a polyphase current differing in frequency from the power current and balanced as long as the line is sound. At another point of the line is connected a receiver for the superimposed current. The arrangement is such that the resultant phase impedances of the generator and the receiver have the same values as the characteristic impedances of the line.

In such a system every asymmetric line fault causes current unbalance in the generator and the receiver and accordingly negative phase sequence component currents and every earth fault results in zero phase sequence component currents. Relays responsive to these components effect a signaling operation or the release of circuit breakers at the two points of the line whenever the line is faulty.

The object of my present invention is another simple arrangement whereby the operation of a signalling or releasing relay is effected by reason of the unbalance of the currents which traverse the generator and the receiver. This arrangement comprises in general connecting in series with the impedances of the generator and the receiver additional impedances so proportioned that the voltages across their terminals are dependent on the components of the currents in the unbalanced period.

My invention will be better understood from the following description when considered in connection with the accompanying drawing and its scope will be pointed out in the appended claims.

In the accompanying drawing Fig. 1 illustrates diagrammatically an embodiment of my invention and Fig. 2 illustrates diagrammatically a modification of my invention, and Figs. 3 to 7 inclusive are vector diagrams explanatory of my invention.

As shown in Fig. 1, the conductors 10, 11, 12 of a three-phase system to be protected are provided with suitable circuit interrupting means such as latched closed circuit breakers 13, 14. Each of these circuit breakers is provided with a trip coil 8 which may be supplied from suitable sources of current 9.

In accordance with my invention I install at one end of the line section a suitable source of polyphase current such as a three-phase generator 15 which is electrically coupled to the line by suitable means such as condensers 16. The superimposed current may be of any desired frequency but it differs from the frequency of the power current. In order to avoid standing waves resulting from successive reflections, I provide in series with the generator 15 impedances 17, 18 which are so proportioned that the resulting impedances for the different phases of the generator are equal to the corresponding impedance characteristics of the line. This may be, in effect, surge impedances of the line when the superimposed current is of high frequency, for example, carrier currents. At the other end of the line section there is coupled to the line by suitable means, such as condensers 19, a receiving means comprising impedances 20 and 21 so proportioned that the impedances of the phases of the resulting network are equal to the corresponding impedance characteristics of the line. Also at each end of the line I may install trap circuits 22 for isolating the line section with respect to the rest of the system so far as the current superimposed by the generator 15 is concerned.

Further, in accordance with my invention a circuit for detecting the unbalance of the superimposed polyphase current comprises at each end of the section a network of impedance devices 23, 24, 25 and 26, 27, 28. These devices all have the same ohmic impedance value and are connected in series respectively with the impedances 17, 18 and 20, 21. Their impedance value may be small and negligible in comparison with that of the impedances 17, 18, 20 and 21. If not, then the impedances 17, 18, 20 and 21 are so modified that the total impedance taking into account the additional impedances 23, 24, 25 and 26, 27, 28 per phase of the generator and of the receiving means remains equal to the corresponding impedance characteristics of the line.

Each of the impedances 23, 26 comprises a condenser 29 and a resistor 30 connected in series and so proportioned that the voltages across their outside or extreme terminals lag the currents which traverse them by substantially 60°. Each of the impedances 24, 27 comprises a resistance, such that the voltages across their terminals are in phase with the currents which traverse them. Each of the impedances 25, 28 includes an inductance 31 and a resistance 32 so proportioned that the voltages across their outside terminals lead the currents which traverse them by substantially 60°. The impedance devices, therefore, have different current voltage phase displacements such that on unbalance of the currents traversing them voltages dependent on the negative and zero phase sequence components of these currents are available.

In order to obtain the desired polarity from the voltages across the resistances 24 and 27 for combining with the voltages across the impedances 23, 25, 26 and 28 as hereinafter set forth, I may use one to one ratio transformers 33 whose primary windings are connected across the terminals 34, 35 of the resistances 24 and 27, respectively. The secondary windings of these transformers may have one end or terminal 36 connected to the corresponding end of the primary windings, as shown, and they are so arranged that the voltages across their terminals 36, 37 are equal and substantially opposite in sign to the voltages across their primary windings.

In order to employ the voltages across the impedance devices 23, 24, 25 and 26, 27, 28 so as to obtain a highly sensitive and quick response action dependent on the negative and zero phase sequence components of the superimposed polyphase current, I may employ electric discharge valve means connected to be energized in accordance with the resultants of voltages across these impedance devices. Thus, there may be employed two valves 38, 39 at one end of the section and two valves 40, 41 at the other end of the section. One of each of these two sets of valves is connected to be energized in accordance with the sum of the voltages across two of the impedance devices and the other is connected to be energized in accordance with the sum of the voltages across one of said two impedance devices and the third impedance device. As shown, the upper terminal of the impedance device 23 and the terminal 37 of the transformer secondary at one end of the section are connected to the control electrode and cathode respectively of the valve 38. At the other end of the section the upper terminal of the impedance device 26 and the terminal 37 of the transformer at this end are connected to the control electrode and cathode respectively of the valve 41. Also the upper terminal of the impedance 25 and the terminal 37 of the secondary winding of the transformer 33 at one end are connected to the control electrode and cathode respectively of the valve 39. At the other end the upper terminal of the impedance 28 and the terminal 37 of the secondary winding of the transformer 33 are connected to the control electrode and cathode respectively of the valve 40.

For effecting an operation dependent on an unbalance of the superimposed polyphase current, I may employ relays 42 and 43 connected in the plate circuits of the valves 38, 39 and 40, 41 respectively. These relays may be substantially instantaneous and, as shown, have their contacts connected in the circuits of the trip coils 8. The energizing winding of relay 42 is connected in the plate circuits of the valves 38 and 39 and the energizing winding of the relay 43 is connected in the plate circuits of the valves 40 and 41. The plate circuits of the valves 38 and 39 may be supplied from suitable sources 44. The cathode circuits may be supplied from suitable sources 45. For normally insuring the valves 38, 39, 40 and 41 from being conductive under apparent voltage unbalance conditions, there may be supplied control electrode biasing voltages by suitable sources 46. These may also serve to control the extent of unbalance at which it is desired to effect operation.

The operation of the embodiment of my invention shown in Fig. 1 may be better understood in connection with the vector diagrams of Figs. 3 to 7 inclusive. Thus, in Fig. 3 assuming balanced conditions, that is no fault on the section of the system in question, then the currents in and the voltages across the impedances 23, 24, 25 will be as indicated by the $i$ and $e$ vectors with their respective subscripts. The voltage on the control electrode of the valve 38 is then $e_{23}-(-e_{24})$ or $e_{23}+e_{24}$, which is normally zero, that is as long as the polyphase superimposed current is balanced. The voltage on the control electrode of the valve 39 is $e_{25}-(-e_{24})$ or $e_{25}+e_{24}$, which is normally zero. Likewise, the voltages derived from the impedance network 26, 27, 28 and applied to the control electrodes of the valves 40 and 41 are normally zero. Consequently, none of the valves is normally conductive.

Assuming now a short-circuit across line conductors 11 and 12 in the section between the circuit breakers 13 and 14, then the current and voltage conditions of the polyphase superimposed current at the end where the generator 15 is located are as shown by the vector diagram of Fig. 4. The polyphase superimposed current is no longer balanced and the voltage $e_{23}+e_{24}$ now applied to the control electrode of the valve 38 has a value dependent on the severity of the fault. If this voltage is sufficient to overcome the bias of the battery 46, the valve 38 is rendered conductive whereby to effect the energization of the relays 42 and the tripping of the circuit breaker 13. At the other end of the line section the current and voltage conditions of the polyphase superimposed current are substantially as shown by the vector diagram of Fig. 5. In this case the voltage $e_{26}+e_{27}$ is applied to the control electrode of the valve 41 and the voltage $e_{28}+e_{27}$ to the control electrode of the valve 40. In this case both valves are controlled by different amounts but one or the other or both are rendered conductive to energize the relay 43 and thereby trip the circuit breaker 14.

Assuming now a fault to ground on the conductor 12 within the section between circuit breakers 13 and 14, then the current voltage unbalance conditions of the polyphase superimposed current at the generator end are as shown in the vector diagram of Fig. 6. In this case the voltage $e_{23}+e_{24}=e_{23}$, since $e_{24}$ so far as fault voltage is concerned is zero, is applied to the control electrode of the valve 38 which becomes conductive and thereby effects the tripping of circuit breaker 13. At the other end of the section the current-voltage unbalance conditions of the superimposed polyphase current are as shown in the vector diagram of Fig. 7. The control electrodes of valves 40 and 41 are now energized by $e_{26}+e_{27}$ and by $e_{28}+e_{27}$, respectively, and one or the other or both valves become conductive and thereby effect the tripping of circuit breaker 14.

From the foregoing the operation under faults involving other conductors will be apparent. It will also be apparent that because of the traps 22 faults outside the line section under consideration, do not disturb the balance of the polyphase current superimposed on this section. Consequently, arrangements embodying my invention provide a selective action whereby only a faulty section is disconnected.

The embodiment of my invention shown in Fig. 1 can be modified, as shown in Fig. 2, without altering the scheme of operation. Fig. 2 is limited to the representation of the impedances 17, 18 and the unbalance detector circuit or impedance network.

In this modification of my invention the resistance 24 is energized by a current transformer 47. This transformer and the resistance 24 are so dimensioned that the voltage across the terminals of the resistance has under normal balanced operation the same value as the voltages across the impedances 23 and 25 but it is displaced 180° with reference to the current which circulates in the primary winding of the transformer. Impedances 23 and 25 and the terminal 48 of the secondary winding of the transformer are respectively connected to the same control electrodes of the valves 38 and 39 as impedances 23 and 25 and terminal 37 of the secondary winding of the transformer 33 of Fig. 1.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, a polyphase alternating current electric system and fault responsive means therefor including means for superimposing on the phase conductors of the system a polyphase current of a frequency differing from the frequency of the power current of the system including a source of polyphase current, a plurality of impedance devices respectively connected in the phase conductors of the superimposed polyphase current, said impedance devices having substantially the same impedance value but different current-voltage phase displacement values and electric discharge valve means connected to be controlled in accordance with the resultant of the voltages across two of said impedance devices.

2. In combination, a polyphase alternating current electric system and fault responsive means therefor including means for superimposing on the phase conductors of the system a polyphase current of a frequency differing from the frequency of the power current of the system including a source of polyphase current, electric discharge valve means and means for controlling the conductivity of said electric discharge valve means in response to the negative phase sequence component of the superimposed polyphase current.

3. In combination, a polyphase alternating current electric system and fault responsive means therefor including means for superimposing on the phase conductors of the system a polyphase current of a frequency differing from the frequency of the power current of the system including a source of polyphase current, electric discharge valve means and control means for rendering said electric discharge valve means conductive in dependence on the negative phase sequence and the zero phase sequence components of the superimposed polyphase current.

4. In combination, a polyphase alternating current electric system and fault responsive means therefor including means for superimposing on the phase conductors of the system a polyphase current of a frequency differing from the frequency of the power current of the system including a source of polyphase current, electric discharge valve means and means for normally rendering said discharge valve means non-conductive including an impedance network connected in the circuits of said superimposed polyphase current and proportioned to render said discharge valve means conductive in accordance with the negative and the zero phase sequence components of the superimposed polyphase current.

5. In combination, a three-phase alternating current electric circuit, circuit interrupting means at each of two points of the circuit for isolating the portion of the circuit between said points and means for effecting the operation of said circuit interrupting means on the occurrence of a fault within said portion including means for superimposing on the phase conductors of the circuit a three-phase current of a relatively high frequency including a source of three-phase alternating current, electric discharge valve means for controlling the opening of said circuit interrupting means, said electric discharge valve means having control electrode means and means for controlling the control electrode means of said electric discharge valve means in accordance with the phase balance of the superimposed high frequency current including an impedance network connected in the circuit of the superimposed high frequency current and proportioned to render said discharge valve means normally non-conductive and conductive on the occurrence of a fault on said circuit portion in accordance with the negative and zero phase sequence components of the superimposed three-phase current.

6. In combination, a three-phase alternating current electric system, circuit interrupting means at each of two points of the system for isolating the portion of the system between said points and means for effecting the operation of said circuit interrupting means on the occurrence of a fault within said portion including means for superimposing on the phase conductors of the system a three-phase current of a relatively high frequency including a source of three-phase alternating current, impedance devices respectively connected in the phase conductors of the superimposed high frequency current, said impedance devices having substantially the same impedance value and current-voltage phase displacements of substantially plus 60°, 0°, and minus 60° respectively, an electric discharge valve having control electrode means connected to be energized in accordance with the sum of the voltages across two of said impedance devices and another electric discharge valve having control electrode means connected to be energized in accordance with the sum of the voltages across one of said two impedance devices and the third impedance device.

7. In combination, a polyphase alternating current electric system and fault responsive means therefor including means for superimposing on the phase conductors of the system a polyphase current of a frequency differing from the frequency of the power current of the system including a source of polyphase current, and means responsive to the negative phase sequence component of the superimposed polyphase current for controlling said system.

JEAN FALLOU.